United States Patent
Tang et al.

(10) Patent No.: US 10,691,734 B2
(45) Date of Patent: Jun. 23, 2020

(54) SEARCHING MULTILINGUAL DOCUMENTS BASED ON DOCUMENT STRUCTURE EXTRACTION

(71) Applicant: INTERNATIONAL BUSINESS MACHINES CORPORATION, Armonk, NY (US)

(72) Inventors: Xin Tang, Ningbo (CN); Kun Yan Yin, Ningbo (CN); He Li, Beijing (CN); XueLiang Zhao, Shanghai (CN); Xin Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 15/818,860

(22) Filed: Nov. 21, 2017

(65) Prior Publication Data
US 2019/0155942 A1 May 23, 2019

(51) Int. Cl.
*G06F 16/33* (2019.01)
*G06F 16/93* (2019.01)
(Continued)

(52) U.S. Cl.
CPC ........ *G06F 16/3344* (2019.01); *G06F 16/338* (2019.01); *G06F 16/353* (2019.01);
(Continued)

(58) Field of Classification Search
CPC ............. G06F 16/3344; G06F 16/9535; G06F 16/353; G06F 16/338; G06F 16/93; G06F 17/28; G06F 17/289
See application file for complete search history.

(56) References Cited

U.S. PATENT DOCUMENTS 6,006,221 A 12/1999 Liddy
6,766,316 B2 * 7/2004 Caudill ................. G06F 16/353
(Continued)

OTHER PUBLICATIONS

Notification of Transmittal of the International Search Report and the Written Opinion of the International Searching Authority, of the Declaration; dated Mar. 13, 2019; PCT/IB2018/059130; Filing Date Nov. 20, 2018; 9 pages.

*Primary Examiner* — James E Richardson
(74) *Attorney, Agent, or Firm* — Schmeiser, Olsen & Watts; Mark C. Vallone

(57) ABSTRACT

An approach is provided for searching multilingual documents. Structure components are extracted from multilingual documents. Based on the extracted components, the documents are grouped into classifications including respective sets of documents expressed in different respective natural languages. A natural language in a query is detected. One of the documents is selected based on the document having content indicated by the query and the natural language of the document matching the detected natural language. Structure components of the selected document are extracted. Based on the extracted structure components of the selected document, one of the classifications is identified as including the selected document. Other document(s) in the classification are identified and presented as having content that matches the content of the selected document. The natural language(s) of the other document(s) are each different from the natural language of the selected document.

13 Claims, 8 Drawing Sheets

(51) Int. Cl.
  *G06F 16/338*   (2019.01)
  *G06F 16/35*    (2019.01)
  *G06F 16/9535*  (2019.01)
  *G06F 40/40*    (2020.01)
  *G06F 40/58*    (2020.01)

(52) U.S. Cl.
  CPC .......... *G06F 16/93* (2019.01); *G06F 16/9535* (2019.01); *G06F 40/40* (2020.01); *G06F 40/58* (2020.01)

(56) References Cited

U.S. PATENT DOCUMENTS

| | | | |
|---|---|---|---|
| 7,283,997 B1* | 10/2007 | Howard, Jr. | G06F 16/337 |
| 7,917,488 B2* | 3/2011 | Niu | G06F 16/951 |
| | | | 707/706 |
| 8,175,864 B1* | 5/2012 | Dubiner | G06F 17/2827 |
| | | | 704/2 |
| 9,032,289 B1* | 5/2015 | Cierniak | G06F 16/9558 |
| | | | 715/255 |
| 2006/0059132 A1* | 3/2006 | Zhang | G06F 16/9577 |
| 2010/0042623 A1 | 2/2010 | Feng et al. | |
| 2010/0082511 A1 | 4/2010 | Niu et al. | |
| 2014/0129212 A1 | 5/2014 | Danielyan et al. | |
| 2014/0143238 A1* | 5/2014 | Jain | G06F 16/68 |
| | | | 707/723 |
| 2016/0358072 A1* | 12/2016 | Hermann | G06N 3/0427 |
| 2017/0118576 A1* | 4/2017 | Sharifi | H04L 67/22 |
| 2017/0177712 A1* | 6/2017 | Kopru | G06F 17/289 |

\* cited by examiner

410 ↘ travel, reimbursement, policy, newline, underscore, introduction, newline, the, document, is, about, travel, reimbursement, policy, newline, table, requirement, newline, label, you, cannot, reimburse, more, than, $1000, at, one, time, newline, label, you, must, get, pre-approval, when, you, submit, your, travel, expense, newline, label, the, hotel, expense, must, include, item, details } 404

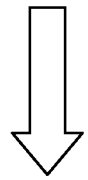

(word, word, word, newline, underscore, word, newline, word, word, word, word, word, word, word, newline, table, word, newline, label, word, word, word, word, word, word, word, word, word, newline, label, word, word, word, word, word, word, word, word, word, word, newline, label, word, word, word, word, word, word, word) } 412

*FIG. 4B*

SEARCHING MULTILINGUAL DOCUMENTS BASED ON DOCUMENT STRUCTURE EXTRACTION

BACKGROUND

The present invention relates to information retrieval, and more particularly to retrieving multilingual documents.

International business and corporate globalization require that companies communicate in many natural languages and dialects. For many instances of an event or an object, there are substantial amounts of interrelated reports, reviews, or descriptions from different perspectives and in different natural languages. Multiple versions of a single internal document of a company may be generated, where each of the versions has the same content, but is expressed in a different natural language. A user may utilize a search query expressed in a natural language in which the user is proficient in order to find multilingual versions of a document. Known information retrieval systems translate multilingual versions of a document into a single natural language, and then apply searches across the multilingual versions using that single natural language. The translation of a document is often inaccurate, especially if the document includes terminology in a domain of a specific industry. To improve translation accuracy, users must expend effort to understand the meaning of the document and know how to translate the document from one language to a different language, including how to translate terminology that is specific to a particular industry's domain.

Other known information retrieval systems require multiple search engines to search for multilingual versions of a document, where a single search query is translated into multiple natural languages and each search engine searches for text in a corresponding one of those natural languages. The translation of the search query is subject to the same inaccuracies and difficulties mentioned above.

Still other known information retrieval systems perform multilingual searching based on identifying images in a first document expressed in a first natural language and then searching for documents expressed in other natural languages that include images similar to the images in the first document. Different language versions of a document that have the same textual content, however, may not always include similar images, and therefore inaccurate search results may be generated.

Accordingly, there is a need for a technique that efficiently searches for multilingual documents without requiring translation of the documents or the search query and without requiring multiple, language-specific search engines.

SUMMARY

In one embodiment, the present invention provides a method of searching documents expressed in multiple natural languages. The method includes a computer extracting components of structures of the documents expressed in the multiple natural languages. The method includes based on the extracted components of the structures of the documents, the computer classifying the documents into classifications including respective, mutually exclusive sets of documents expressed in different respective natural languages. The documents in each set have matching content. The method further includes the computer detecting a natural language in a query. The method further includes based on the query and the detected natural language and based on a utilization of a search engine, the computer selecting a document included in the documents whose content is indicated by the query and whose natural language matches the detected natural language. The method further includes the computer extracting first components of a structure of the selected document. The method further includes based on the extracted first components, the computer identifying a classification included in the classifications as including the selected document. The method further includes the computer identifying one or more other documents in the identified classification. The method further includes the computer presenting the one or more other documents as having content that matches the content of the selected document. The one or more other documents are expressed in one or more respective natural languages different from the natural language of the selected document.

The aforementioned embodiment provides multilingual searching of documents that is efficient and does not require translation or multiple language-specific search engines. The aforementioned embodiment advantageously allows a user who is proficient in only one language to compose a search query to retrieve multilingual versions of a document without requiring the user to translate the search query, the document, or any portion of the document, and without requiring the user to understand the semantic meaning of the document or to understand domain-specific terminology used in the document.

The advantages discussed above also apply to the computer system and computer program product embodiments, which are summarized below.

In one optional aspect of the present invention, the steps of the aforementioned method are performed without translating the document, the one or more other documents, or the query. The aforementioned aspect of the present invention advantageously provides searching for multilingual documents where a user composes a search query to retrieve multilingual versions of a document without requiring the user to expend effort in a difficult and error-prone exercise of understanding the meaning of any portion of the content of the multilingual versions of the document, and where the search does not require language-specific search engines to translate the search query or the document whose language and content matches the search query.

In another optional aspect of the present invention, the step of extracting the components includes modeling the structure of a first document included in the documents as a first stream of the first components. The stream includes words of the document and other indicators of the structure of the document, without an indication of a semantic meaning of the document. The step of extracting the components further includes replacing the words in the stream with a first tag indicating a word. The step of extracting the components further includes subsequent to the step of replacing, encoding the stream as a numerical vector by utilizing a long short-term memory (LSTM) network which learns the sequences of the components. The step of classifying the documents includes determining a classification that includes the document and the one or more other documents. The classification is determined by minimizing a distance between the numerical vector and one or more other numerical vectors resulting from an encoding of one or more other streams that model the one or more other documents. The aforementioned aspect of the present invention advantageously provides a language-agnostic technique for determining multilingual documents that have the same or similar content, without requiring translation or knowledge of semantic meaning of the content of the documents. The determination of the same or similar multilingual documents advantageously utilizes an efficient comparison of densely encoded vectors which represent the structure of the documents rather than using a comparison of extremely long vectors.

In another embodiment, the present invention provides a computer program product for searching documents expressed in multiple natural languages. The computer program product includes a computer readable storage medium. Program instructions are stored on the computer readable storage medium. The computer readable storage medium is not a transitory signal per se. The program instructions are executed by a central processing unit (CPU) of a computer system to cause the computer system to perform a method. The method includes the computer system extracting components of structures of the documents expressed in the multiple natural languages. The method further includes based on the extracted components of the structures of the documents, the computer system classifying the documents into classifications including respective, mutually exclusive sets of documents expressed in different respective natural languages. The documents in each set have matching content. The method further includes the computer system detecting a natural language in a query. The method further includes based on the query and the detected natural language and based on a utilization of a search engine, the computer system selecting a document included in the documents whose content is indicated by the query and whose natural language matches the detected natural language. The method further includes the computer system extracting first components of a structure of the selected document. The method further includes based on the extracted first components, the computer system identifying a classification included in the classifications as including the selected document. The method further includes the computer system identifying one or more other documents in the identified classification. The method further includes the computer system presenting the one or more other documents as having content that matches the content of the selected document. The one or more other documents are expressed in one or more respective natural languages different from the natural language of the selected document.

In another embodiment, the present invention provides a computer system including a central processing unit (CPU); a memory coupled to the CPU; and a computer readable storage device coupled to the CPU. The storage device includes instructions that are executed by the CPU via the memory to implement a method of searching documents expressed in multiple natural languages. The method includes a computer system extracting components of structures of the documents expressed in the multiple natural languages. The method further includes based on the extracted components of the structures of the documents, the computer system classifying the documents into classifications including respective, mutually exclusive sets of documents expressed in different respective natural languages. The documents in each set have matching content. The method further includes the computer system detecting a natural language in a query. The method further includes based on the query and the detected natural language and based on a utilization of a search engine, the computer system selecting a document included in the documents whose content is indicated by the query and whose natural language matches the detected natural language. The method further includes the computer system extracting first components of a structure of the selected document. The method further includes based on the extracted first components, the computer system identifying a classification included in the classifications as including the selected document. The method further includes the computer system identifying one or more other documents in the identified classification. The method further includes the computer system presenting the one or more other documents as having content that matches the content of the selected document. The one or more other documents are expressed in one or more respective natural languages different from the natural language of the selected document.

BRIEF DESCRIPTION OF THE DRAWINGS

FIGS. 4A-4D depict an example of extracting and encoding features of a structure of a document within the process of FIG. 2, in accordance with embodiments of the present invention.

DETAILED DESCRIPTION

Overview

Figure 1:
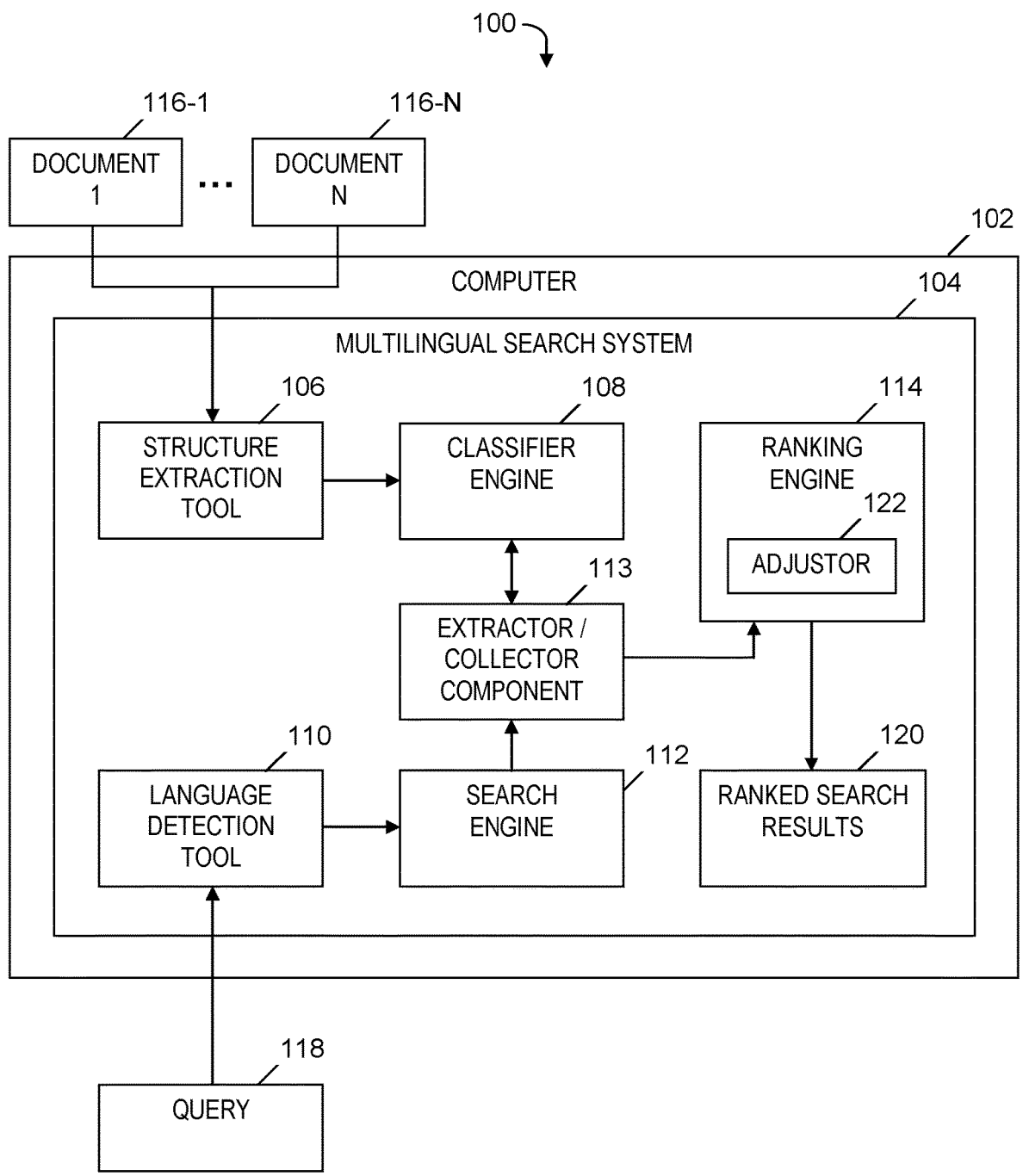
FIG. 1 is a block diagram of a system for searching documents expressed in multiple natural languages, in accordance with embodiments of the present invention.

Embodiments of the present invention provide an efficient search of multilingual documents without translation. The multilingual documents are documents whose contents are expressed in different respective natural languages. At least some of the documents have matching content, but are expressed in different natural languages (i.e., at least some of the documents are multilingual versions of the same document). For example, the same human resources policy manual of a corporation may exist as a first document expressed in a first language, a second document expressed in a second language, and a third document expressed in a third language, where the first, second, and third documents have matching content. The search of the multilingual documents described herein is based on a first content of a first document matching a second content of a second document if components (i.e., features) of the structure of the first document match the components of the structure of the second document, even though the contents (i.e., text) of the first and second documents may be expressed in different natural languages. The components of the structure of a document includes words, images, indicators of the start of lines, and labels that indicate, for example, space, tab, HyperText Markup Language (HTML) tag, title, subtitle, table, etc. Other components of the structure of a document may indicate the position of an image, the length of a section, the number of sentences, the number of paragraphs, the start of a sentence, and the start of a paragraph. In one embodiment, the aforementioned documents being searched are electronic structured documents that include embedded markup coding that provides structural meanings to the whole document and portions of the document. As used herein, versions of a document are instances of a document that have content that is expressed in respective languages that differ from one another, but the content expresses the same meaning in each of the versions.

As used herein, a natural language is defined as a language that has evolved naturally in humans through use and repetition without conscious planning or premeditation, and is different from constructed and formal languages that include computer programming languages and languages consciously devised to study logic. As used herein, the term "language" and "languages" means a natural language and natural languages, respectively, unless the term is modified by a reference to a constructed language and/or a formal language.

Known approaches to searching across one document and other documents that have the same content and are written in different languages utilize translation of the other documents into the language of the one document, followed by a search across the one document and the translated documents. For example, a known approach may select an English language human resources policy document and translate into English other human resource policy documents that are originally written in Chinese and Korean, and subsequently search across the documents using a query which is either in English originally, or is translated into English if the query is originally in another language. The translations used in the known approach require effort and may be inaccurate translations, which may cause the search results to be inaccurate or incomplete. Other known approaches to searching across the above-mentioned documents written in different languages involve the utilization of different search engines for each language, but still introduce inaccuracies of translation in translating a search query into the different languages, which again may cause the search results to be inaccurate or incomplete. Furthermore, a user may need to translate or understand the meaning of the content of the search results, which are expressed in different languages, in order to verify that the documents in the search results actually have the same content, but the user may not have the level of proficiency in the different languages to (i) perform the translation, (ii) understand the meaning of the documents in different languages, or (iii) understand the meaning of specialized terminology in the documents. Still other known approaches to searching across multilingual documents utilize image similarity recognition by searching a first document by one language, determining images included in the first document, and finding documents in other languages which include images similar to the images in the first document. The image similarity recognition approach may cause inaccurate search results because documents in different language versions may not always include similar images. Embodiments of the present invention overcome the aforementioned deficiencies of the known approaches of searching multilingual documents by using extracted features of document structure, under the assumption that multilingual versions of a document usually have the same features of document structure and have the same labels such as images, table, title, subtitle, and number of paragraphs. By using the extracted features of document structure, embodiments of the present invention search for and retrieve multilingual versions of a document without using translation and without requiring a user to have the multiple language proficiency to understand the meaning of the content or the meaning of special terminology in different languages in the multilingual versions of the document, thereby advantageously avoiding (i) an additional effort of translation of document content into a different language, (ii) a requirement of user proficiency in multiple languages, and (iii) a requirement of user proficiency in industry-specific terminology in multiple languages.

For example, a user utilizing a search of multilingual documents using the extracted document structure features, as disclosed herein, retrieves documents that consist of a company's product information manual, where the retrieved documents are in different languages but consist of the same content (i.e., content that expresses the same meaning). In this example, the user writes a search query in English and retrieves the product information manual in English because the user has language proficiency in English, but the user also distributes the same product information manual to first and second customers as a first retrieved document written in Chinese and a second retrieved document written in Korean, respectively, because the first and second customers have language proficiency in Chinese and Korean, respectively. In this example, the distribution of the document in different languages is completed without requiring the user to translate English into Chinese or Korean, and without requiring the user to have enough language proficiency in Chinese and Korean to understand the meaning of the content of the first and second documents, or to understand the meaning of industry-specific terminology in the first and second documents.

System for Searching Multilingual Documents

FIG. 1 is a block diagram of a system 100 for searching documents expressed in multiple natural languages, in accordance with embodiments of the present invention. System 100 includes a computer 102, which executes a software-based multilingual search system 104, which includes the following software-based components: a structure extraction tool 106, a classifier engine 108, a language detection tool 110, a search engine 112, an extractor/collector component 113, and a ranking engine 114.

Structure extraction tool 106 receives document 116-1, . . . , document 116-N, where N is an integer greater than one. Structure extraction tool 106 extracts features of the structure of each of documents 116-1, . . . , 116-N.

Classifier engine 108 classifies documents 116-1, . . . , 116-N into mutually exclusive classifications generated by classifier engine 108, so that documents that have matching extracted features are included in the same classification. Having extracted document structure features that match is an indication that the documents have the same or similar content. At least one of the classifications includes documents that have the same content but are expressed in different languages.

Language detection tool 110 receives a query 118, which is a search query to search for a document included in document 116-1, . . . , document 116-N based on keyword(s). Language detection tool 110 detects the language in which query 118 is expressed. Language detection 1101 110 sends query 118 to search engine 112, which is a search engine that searches across documents in the detected language of query 118. Search engine 112 generates a search result that includes one or more documents in the detected language of query 118. Extractor/collector component 113 extracts the features of the structure of each of the documents in the search result and identifies the classification(s) generated by classifier engine 108 that includes each of the documents in the aforementioned search result. Extractor/collector component 113 retrieves the multilingual documents that are included in the identified classification(s).

Ranking engine 114 ranks the documents in the search result and the retrieved multilingual documents, and presents the ranked documents as ranked search results 120 in response to query 118.

In one embodiment, ranking engine 114 includes a software-based adjustor 122 which extracts data about multiple factors, including current query language, user language, and the popularity of documents in the search result. Adjustor 122 generates ranked search results 120 by ranking the documents based on the extracted data about the multiple factors. Adjustor 122 also collects user feedback about search results generated by search engine 112 and adjusts ranked search results 120 according to the collected user feedback. In an alternate embodiment, ranking engine 114 ranks the documents according to one or more of the aforementioned multiple factors, but does not include adjustor 122.

The functionality of the components shown in FIG. 1 is described in more detail in the discussion of FIG. 2, FIG. 3, FIGS. 4A-4D, and FIG. 5 presented below.

Process for Searching Multilingual Searching

Figure 2:
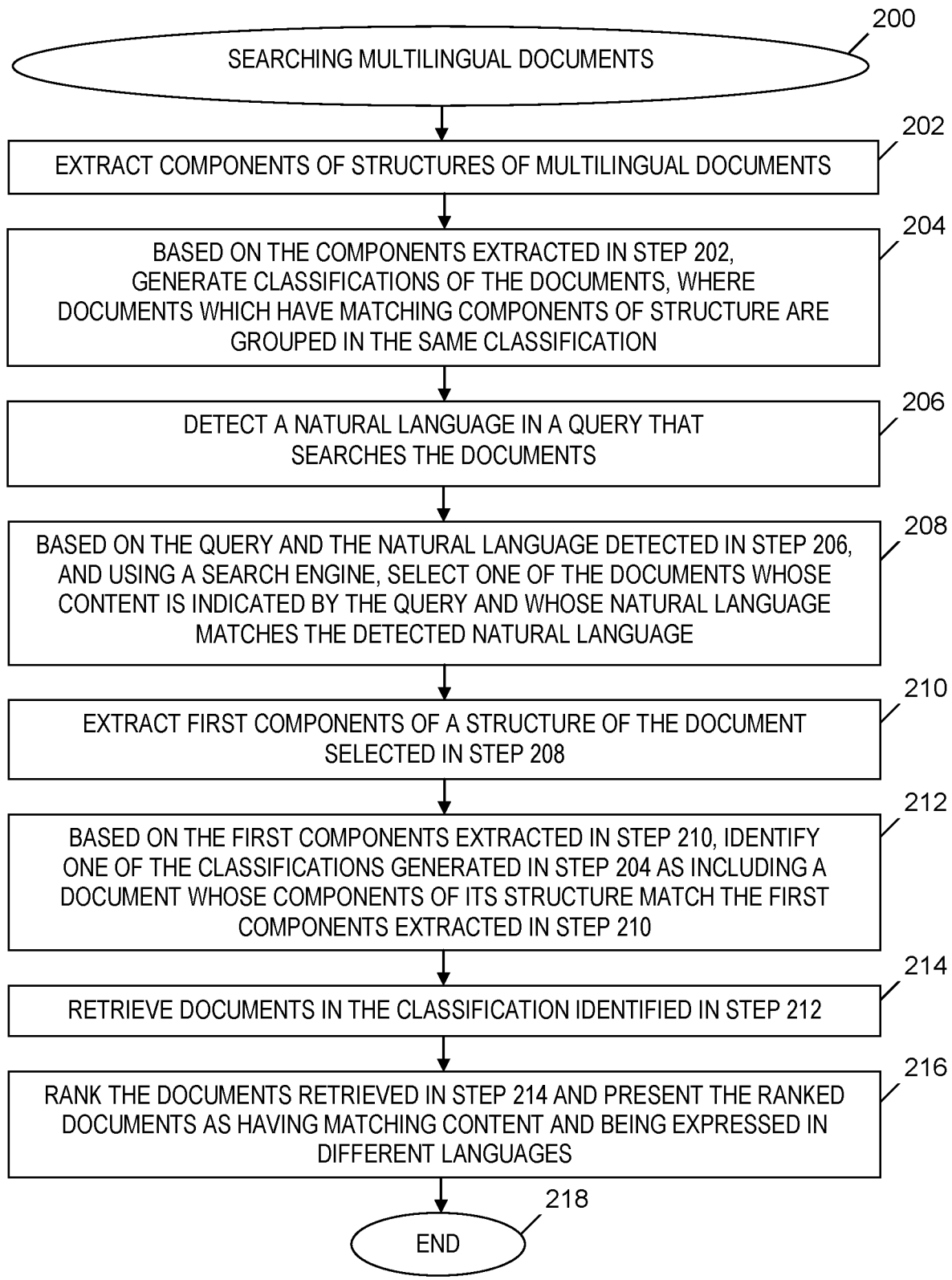
FIG. 2 is a flowchart of a process of searching documents expressed in multiple natural languages, where the process is implemented in the system of FIG. 1, in accordance with embodiments of the present invention.

FIG. 2 is a flowchart of a process of searching documents expressed in multiple natural languages, where the process is implemented in the system of FIG. 1, in accordance with embodiments of the present invention. The process of FIG. 2 begins at step 200. Prior to step 202, multilingual search system 104 (see FIG. 1) receives documents 116-1, . . . , 116-N (see FIG. 1). In step 202, structure extraction tool 106 (see FIG. 1) extracts components (i.e., features) of structures of documents 116-1, . . . , 116-N (see FIG. 1).

In step 204, based on the components extracted in step 202, classifier engine 108 (see FIG. 1) generates classifications of documents 116-1, . . . , 116-N (see FIG. 1) so that documents that have matching extracted features are grouped into the same classification. Documents having the same classification is an indication that the documents have matching content. At least one of the classifications includes documents that have matching content and are expressed in different languages.

Subsequent to the classifications being generated in step 204 and prior to step 206, multilingual search system 104 (see FIG. 1) receives query 118 (see FIG. 1), which is a search query to search across documents 116-1, . . . , 116-N (see FIG. 1). In step 206, language detection tool 110 (see FIG. 1) detects a language used in query 118 (see FIG. 1).

In step 208, based on query 118 (see FIG. 1) and the language detected in step 206, search engine 112 (see FIG. 1) selects a document included in documents 116-1, . . . , 116-N (see FIG. 1), so that the content of the selected document is indicated by query 118 (see FIG. 1) and the language in which the selected document is expressed matches the language detected in step 206.

In step 210, extractor/collector component 113 (see FIG. 1) extracts first components of a structure of the document selected in step 208.

In step 212, based on the first components extracted in step 210, extractor/collector component 113 (see FIG. 1) identifies a classification included in the classifications generated in step 204 that includes a document whose components of its structure match the first components extracted in step 210.

In step 214, extractor/collector component 113 (see FIG. 1) retrieves the documents in the classification identified in step 212, where the retrieved documents include (1) the document selected in step 208 and (2) other document(s) (i) whose content matches the content of the document selected in step 208 and (ii) are expressed in respective language(s) that are different from the language detected in step 206.

In step 216, ranking engine 114 (see FIG. 1) rank the documents retrieved in step 214 and presents the ranked documents as documents having matching content and are expressed in different languages. In one embodiment, the ranking of the retrieved documents is based on a vector of multiple factors, which include the current language of query 118 (see FIG. 1), the language of the user who provided query 118 (see FIG. 1), and the popularity of each of the retrieved documents. In one embodiment, adjustor 122 collects user feedback about the search results provided by search engine 112 (see FIG. 1) and adjusts the ranking of the retrieved documents based on the collected user feedback.

In one embodiment, the extraction of components of the structure of a given document in step 202 and step 210 includes (1) modeling the structure of the document as a stream of components, where the stream includes words in the text of the document and further includes other indicators of the structure of the document, without an indication of the semantic meaning of the document; (2) replacing the words in the stream with a tag that indicates a word (e.g., replace the words "travel," "reimbursement," and "policy" with "word," "word," and "word"); and (3) subsequent to replacing the words, encoding the stream as a numerical vector by utilizing a long short-term memory (LSTM) network 434 in a deep neural network architecture.

In one embodiment, the generation of the classifications in step 204 includes determining a classification that includes a given document and one or more other documents by determining that distances are minimized between a numerical vector that encodes the structure stream that models the given document and each of one or more other numerical vectors that encode one or more other structure streams that model the one or more other documents (i.e., the distances are less than a predefined threshold distance). The identification of the classification in step 212 includes (1) by utilizing an LSTM network, determining another numerical vector that encodes a structure stream that models another document; (2) determining a distance between the other numerical vector and a numerical vector that encodes a structure stream that models a first document that is included in the classification; (3) determining that the distance is less than a predetermined threshold distance; and (4) based on the distance being less than the threshold distance, determining that the one or more documents included in the classification have content that matches the content of the other document.

Examples

Figure 3:
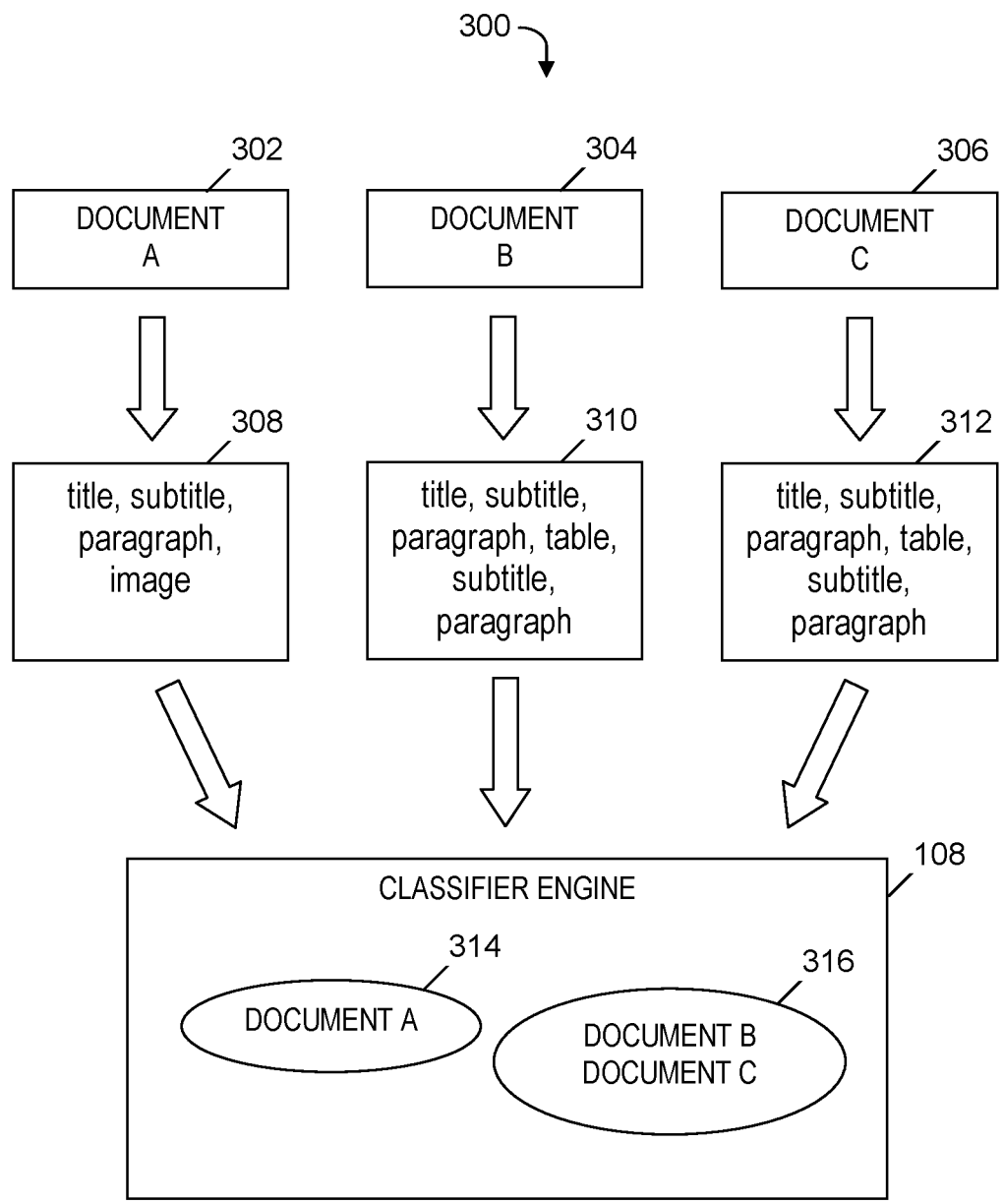
FIG. 3 is an example of extracting features of structures of documents and classifying the documents based on the extracted features within the process of FIG. 2, in accordance with embodiments of the present invention.

FIG. 3 is an example 300 of extracting features of structures of documents and classifying the documents based on the extracted features within the process of FIG. 2, in accordance with embodiments of the present invention. Example 300 includes structure extraction tool 106 (see FIG. 1) receiving document 302, document 304, and document 306, and extracting (1) components 308 of the structure of document 302, (2) components 310 of the structure of document 304, and (3) components 312 of the structure of document 306. The extraction of the aforementioned components is included in step 202 (see FIG. 2). Classifier engine 108 receives components 308, 310, and 312 and determines that components 310 match components 312 and further determines that components 308 do not match components 310 or components 312. Based on components 308 not matching components 310 or components 312, classifier engine 108 generates a classification 314 that includes only document 302. Based on components 310 matching components 312, classifier engine 108 generates a classification 316 that includes document 304 and document 306. The generation of classification 314 and classification 316 is included in step 204 (see FIG. 2).

Figure 4A:
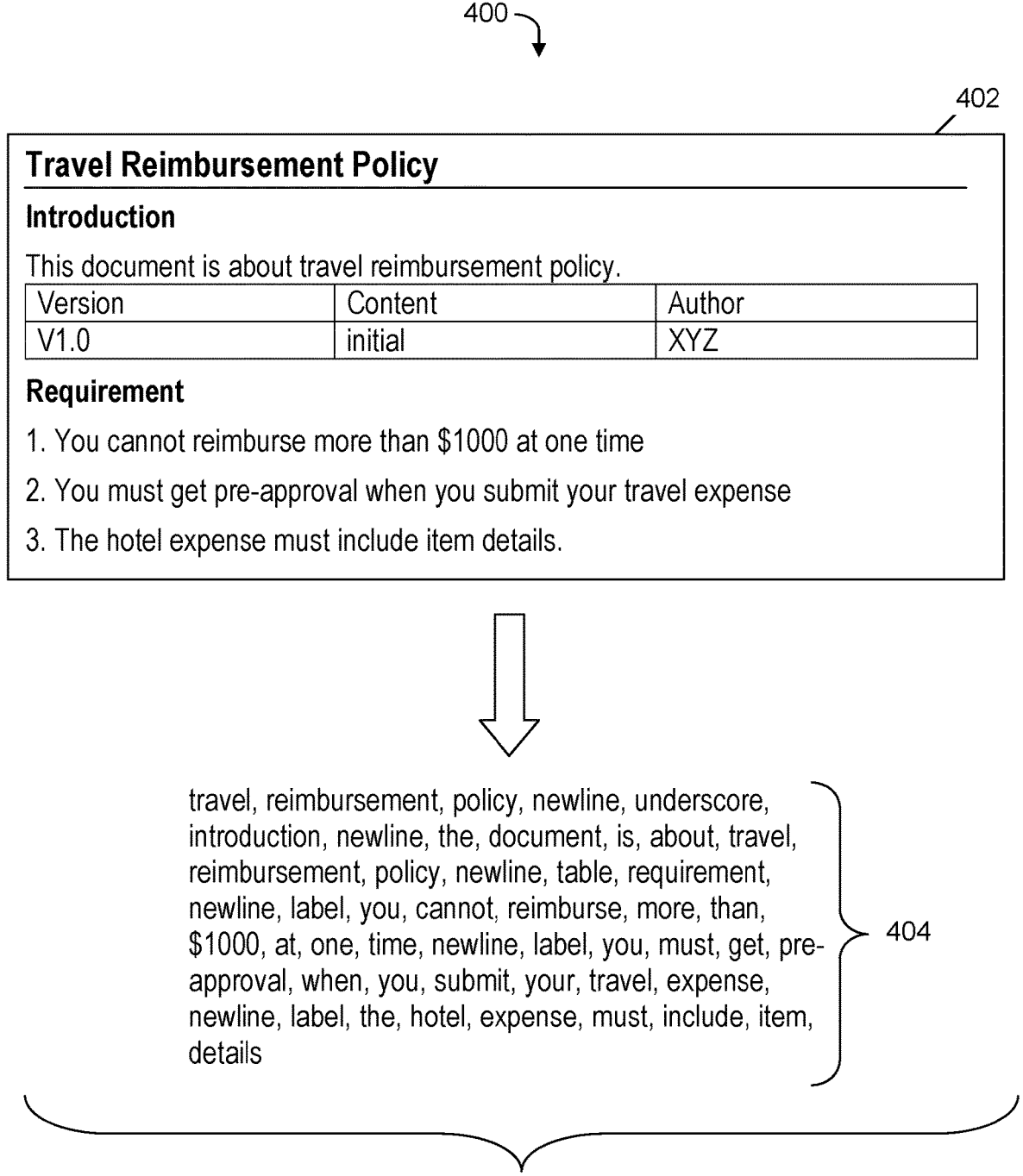

FIGS. 4A-4D depict an example of extracting and encoding features of a structure of a document within the process of FIG. 2, in accordance with embodiments of the present invention. FIG. 4A depicts a first portion 400 of the example of extracting and encoding document structure features. First exemplary portion 400 includes a policy document 402. In step 202 (see FIG. 2), structure extraction tool 106 (see FIG. 1) extracts components (i.e., features) of the structure of policy document 402 and creates a structure stream 404 consisting of the aforementioned components that were extracted from policy document 402. The structure stream 404 includes words in the textual content of policy document 402, indicators of a start of a new line, an indicator of an underscore, an indicator of a table, and labels for a list.

FIG. 4B depicts a second portion 410 of the example of extracting and encoding document structure features. Second exemplary portion 410 includes structure stream 404. Multilingual search system 104 (see FIG. 1) generates a simplified structure stream 412 by replacing all the words included in structure stream 404 with the tag "word."

Figure 4C:
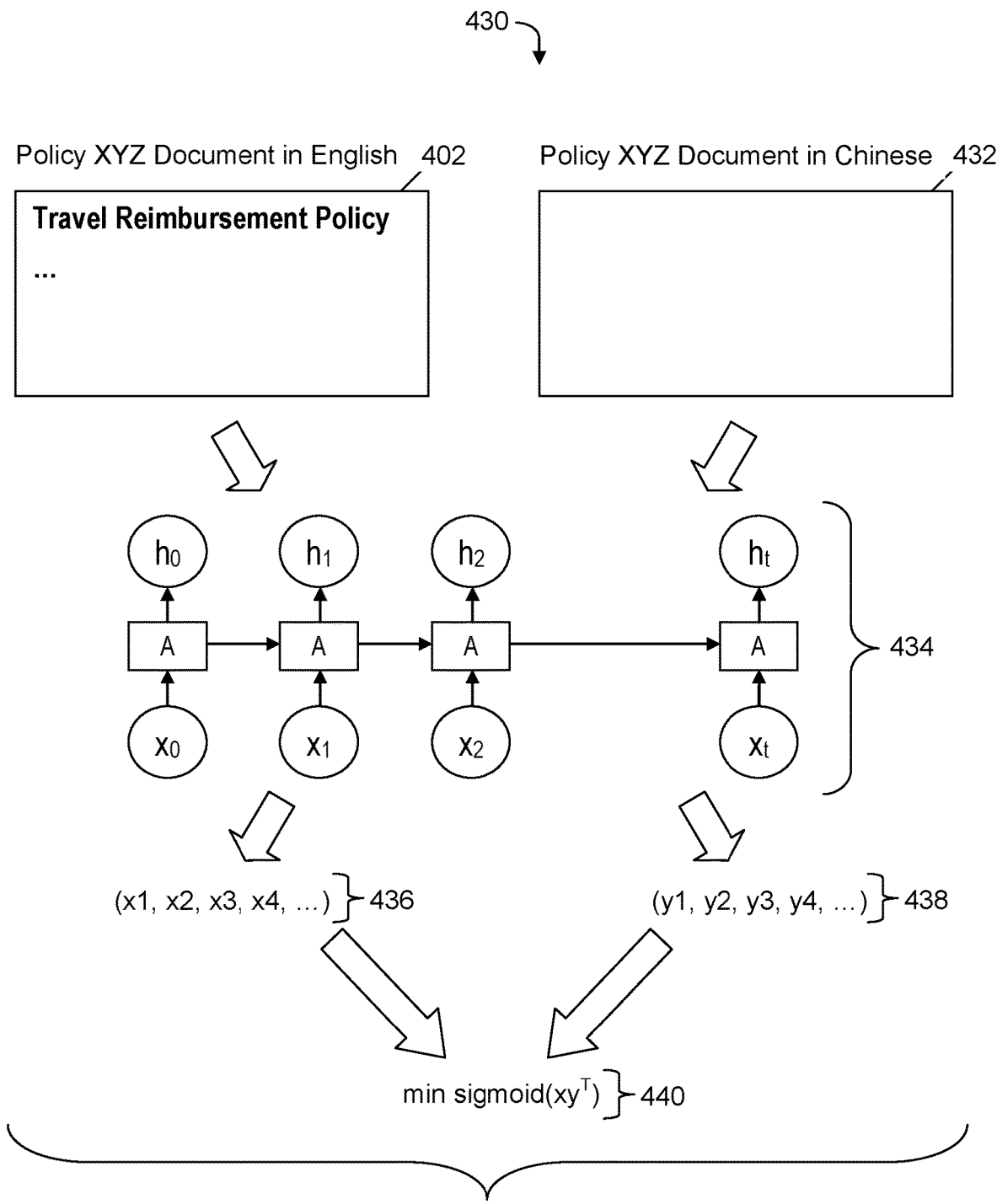

FIG. 4C depicts a third portion 430 of the aforementioned example of extracting and encoding document structure features. Policy document 402 is a document called Policy XYZ Document which is written in English. Policy document 432 is also the Policy XYZ Document, but is written in Chinese. Policy document 402 is encoded into simplified structure stream 412 (see FIG. 4B) and policy document 432 is encoded into a similar simplified structure stream (not shown in FIG. 4C). Multilingual search system 104 (see FIG. 1) further encodes the aforementioned simplified structure streams by employing a long short-term memory (LSTM) network 434 in a deep neural network architecture, which continuously accepts new input and feedback from previous output to itself to memorize the meaningful part of a whole stream. Utilizing the LSTM network 434 transforms simplified structure stream 412 (see FIG. 4B) into a first encoded structure vector 436 and transforms the simplified structure stream that encodes policy document 432 into a second encoded structure vector 438. First encoded structure vector 436 and second encoded structure vector 438 are numeric, fixed length vectors. Classifier engine 108 (see FIG. 1) applies a sigmoid function 440 to first and second encoded structure vectors 436 and 438 and determines whether sigmoid function 440 is minimized. If the sigmoid function 440 is minimized, classifier engine 108 determines that the policy documents 402 and 432 have content that is the same or similar, and groups the documents in the same classification.

Figure 4D:
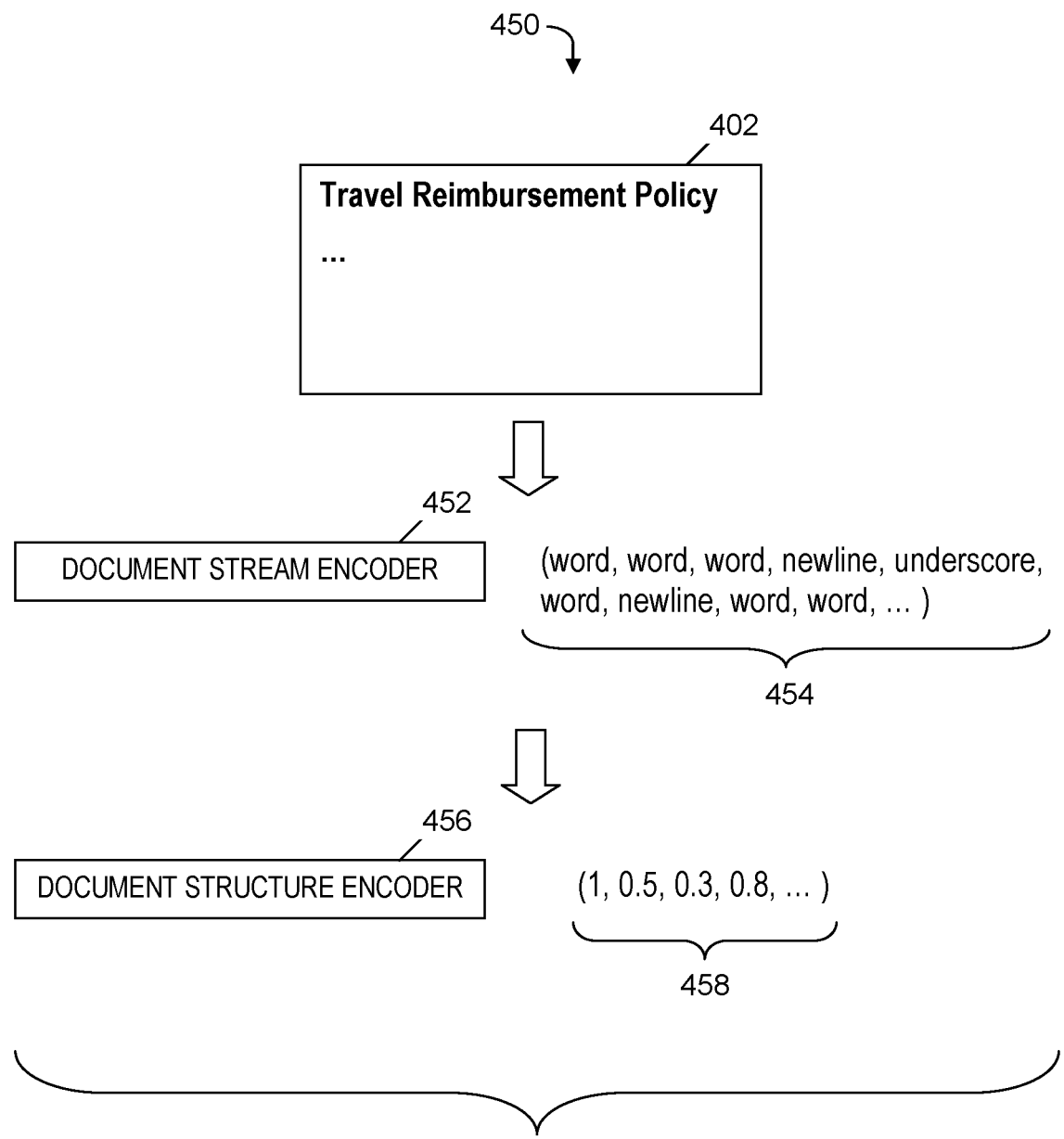

FIG. 4D depicts a fourth portion 450 of the aforementioned example of extracting and encoding document structure features. After classifier engine 108 (see FIG. 1) uses the LSTM network 434 (see FIG. 4C) in a training mode across documents to determine classifications of documents that have the same or similar content, a document stream encoder 452 in multilingual search system 104 (see FIG. 1) encodes policy document 402 into simplified structure stream 454. Subsequently, a document structure encoder 456 (i.e., document structure LSTM encoder) in multilingual search system 104 transforms simplified structure stream 454 into an encoded structure vector 458. In step 212, multilingual search system 104 (see FIG. 1) identifies a classification as including a document that matches policy document 402 by determining that the document in the identified classification is encoded by document structure encoder 456 as an encoded structure vector that matches encoded structure vector 458.

By generating encoded structure vectors which are numeric, fixed length vectors, multilingual search system 104 (see FIG. 1) advantageously represents documents in relatively short vectors rather than relatively long vectors representing the simplified structure streams and avoids difficulties of comparing extremely long vectors to determine documents that have the same or similar content based on the documents having the same structure. For example, a simplified structure stream may have a variable length of more than 3000, whereas the corresponding encoded structure vector generated by document structure encoder 456 may have a fixed length of only 100 elements.

Computer System

Figure 5:
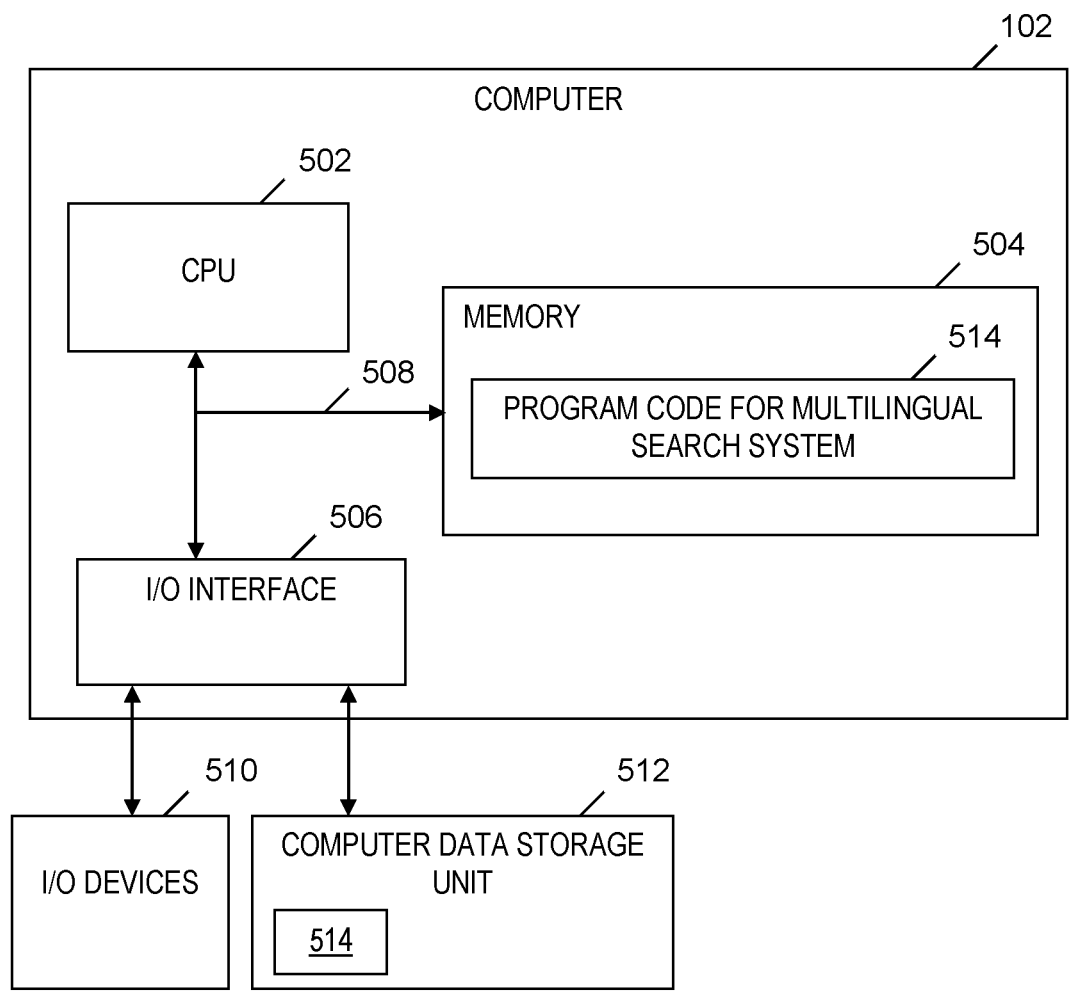
FIG. 5 is a block diagram of a computer that is included in the system of FIG. 1 and that implements the process of FIG. 2, in accordance with embodiments of the present invention.

FIG. 5 is a block diagram of a computer 102 that is included in the system of FIG. 1 and that implements the process of FIG. 2, in accordance with embodiments of the present invention. Computer 102 is a computer system that generally includes a central processing unit (CPU) 502, a memory 504, an input/output (I/O) interface 506, and a bus 508. Further, computer 102 is coupled to I/O devices 510 and a computer data storage unit 512. CPU 502 performs computation and control functions of computer 102, including executing instructions included in program code 514 for multilingual search system 104 (see FIG. 1) to perform a method of searching multilingual documents, where the instructions are executed by CPU 502 via memory 504. CPU 502 may include a single processing unit, or be distributed across one or more processing units in one or more locations (e.g., on a client and server).

Memory 504 includes a known computer readable storage medium, which is described below. In one embodiment, cache memory elements of memory 504 provide temporary storage of at least some program code (e.g., program code 514) in order to reduce the number of times code must be retrieved from bulk storage while instructions of the program code are executed. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including a display, keyboard, etc. Bus 508 provides a communication link between each of the components in computer 102, and may include any type of transmission link, including electrical, optical, wireless, etc.

I/O interface 506 also allows computer 102 to store information (e.g., data or program instructions such as program code 514) on and retrieve the information from computer data storage unit 512 or another computer data storage unit (not shown). Computer data storage unit 512 includes a known computer readable storage medium, which is described below. In one embodiment, computer data storage unit 512 is a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are executed by CPU 502 via memory 504 to search multilingual documents. Although FIG. 5 depicts memory 504 as including program code, the present invention contemplates embodiments in which memory 504 does not include all of code 514 simultaneously, but instead at one time includes only a portion of code 514.

Further, memory 504 may include an operating system (not shown) and may include other systems not shown in FIG. 5.

Storage unit 512 and/or one or more other computer data storage units (not shown) that are coupled to computer 102 may include documents 116-1, ..., 116-N (see FIG. 1), and simplified structured streams and encoded structure vectors that represent the structure of documents 116-1, ..., 116-N (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to searching multilingual documents. Thus, an embodiment of the present invention discloses a process for supporting computer infrastructure, where the process includes providing at least one support service for at least one of integrating, hosting, maintaining and deploying computer readable code (e.g., program code 514) in a computer system (e.g., computer 102) including one or more processors (e.g., CPU 502), wherein the processor(s) carry out instructions contained in the code causing the computer system to search multilingual documents. Another embodiment discloses a process for supporting computer infrastructure, where the process includes integrating computer readable program code into a computer system including a processor. The step of integrating includes storing the program code in a computer readable storage device of the computer system through use of the processor. The program code, upon being executed by the processor, implements a method of searching multilingual documents.

While it is understood that program code 514 for searching multilingual documents may be deployed by manually loading directly in client, server and proxy computers (not shown) via loading a computer readable storage medium (e.g., computer data storage unit 512), program code 514 may also be automatically or semi-automatically deployed into computer 102 by sending program code 514 to a central server or a group of central servers. Program code 514 is then downloaded into client computers (e.g., computer 102) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of searching multilingual documents. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 504 and computer data storage unit 512) having computer readable program instructions 514 thereon for causing a processor (e.g., CPU 502) to carry out aspects of the present invention.

The computer readable storage medium can be a tangible device that can retain and store instructions (e.g., program code 514) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 514) described herein can be downloaded to respective computing/processing devices (e.g., computer 102) from a computer readable storage medium or to an external computer or external storage device (e.g., computer data storage unit 512) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 514) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 5) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 514).

These computer readable program instructions may be provided to a processor (e.g., CPU 502) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 512) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 514) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of searching multiple documents expressed in multiple natural languages, the method comprising the steps of:

a computer extracting multiple components of structures of the multiple documents expressed in the multiple natural languages, wherein the extracting the multiple components includes the steps of:

modeling a structure of a first document included in the multiple documents as a first stream of first components, the first stream including first words of the first document and first indicators of the structure of the first document, without an indication of a semantic meaning of the first document;

replacing, by a document stream encoder, the first words in the first stream with a first tag that indicates that each of the first words replaced by the first tag is a word; and encoding, by a document structure encoder, the first stream as a first numerical fixed length vector by utilizing a long short-term memory (LSTM) network;

based on the extracted components of the structures of the multiple documents, the computer classifying the multiple documents into classifications including respective, mutually exclusive sets of documents expressed in different respective natural languages, the documents in each set having matching content, wherein the step of classifying the multiple documents includes determining a first classification that includes the first document and one or more other documents, the first classification being determined by minimizing a first distance between the first numerical fixed length vector and one or more other numerical fixed length vectors resulting from an encoding of one or more other streams that model the one or more other documents;

the computer detecting a first natural language in a query;

based on the query and the detected first natural language and based on a utilization of a search engine, the computer selecting a second document included in the multiple documents whose content is indicated by the query and whose natural language matches the detected first natural language;

the computer extracting second components of a structure of the second document, wherein the step of extracting the second components includes the steps of:
modeling a structure of the second document as a second stream of the second components, the second stream including second words of the second document and second indicators of the structure of the second document, without an indication of a semantic meaning of the second document;
replacing, by the document stream encoder, the second words in the second stream with the first tag; and
encoding, by a document structure encoder, the second stream as a second numerical fixed length vector by utilizing the LSTM network;
the computer determining a second distance between the second numerical fixed length vector and the first numerical fixed length vector;
the computer determining that the second distance is less than a threshold distance;
based on the extracted second components and the second distance being less than the threshold distance, the computer identifying the first classification as including the second document and determining that a plurality of documents in the identified first classification have content that matches the content of the second document;
the computer ranking the plurality of documents in the identified first classification based on (i) the first natural language in the query, (ii) a second natural language of a user who provides the query, and (iii) a popularity of the plurality of documents in the identified first classification; and
the computer presenting the ranked plurality of documents in the identified first classification as having content that matches the content of the second document, at least one of the ranked plurality of documents in the identified first classification being expressed in a respective natural language different from the natural language of the second document.

2. The method of claim 1, wherein the steps of extracting the multiple components, classifying the multiple documents, detecting the first natural language, selecting the second document, extracting the second components, and presenting the ranked plurality of documents are performed without translating the second document, the plurality of documents in the identified first classification, or the query.

3. The method of claim 1, further comprising the steps of:
the computer collecting user feedback about results of other queries of the multiple documents; and
based on the collected user feedback, the computer adjusting a ranking of the ranked plurality of documents.

4. The method of claim 1, wherein the step of extracting the multiple components includes extracting indicators of words, labels, images, titles, subtitles, paragraphs, tables, and starts of new lines in the multiple documents.

5. The method of claim 1, further comprising the step of:
providing at least one support service for at least one of creating, integrating, hosting, maintaining, and deploying computer readable program code in the computer, the program code being executed by a processor of the computer to implement the steps of extracting the multiple components, classifying the multiple documents, detecting the first natural language, selecting the second document, extracting the second components, determining that the second distance is less than the threshold distance, identifying the first classification, determining that the plurality of documents in the identified first classification have the content that matches the content of the second document, ranking the plurality of documents in the identified first classification, and presenting the ranked plurality of documents.

6. A computer program product for searching multiple documents expressed in multiple natural languages, the computer program product comprising a computer readable storage medium having program instructions stored thereon, wherein the computer readable storage medium is not a transitory signal per se, and the program instructions are executed by a central processing unit (CPU) of a computer system to cause the computer system to perform a method comprising the steps of:
the computer system extracting multiple components of structures of the multiple documents expressed in the multiple natural languages, wherein the step of extracting the multiple components includes the steps of:
modeling a structure of a first document included in the multiple documents as a first stream of first components, the first stream including first words of the first document and first indicators of the structure of the first document, without an indication of a semantic meaning of the first document;
replacing, by a document stream encoder, the first words in the first stream with a first tag that indicates that each of the first words replaced by the first tag is a word; and
encoding, by a document structure encoder, the first stream as a first numerical fixed length vector by utilizing a long short-term memory (LSTM) network;
based on the extracted components of the structures of the multiple documents, the computer system classifying the multiple documents into classifications including respective, mutually exclusive sets of documents expressed in different respective natural languages, the documents in each set having matching content, wherein the step of classifying the multiple documents includes determining a first classification that includes the first document and one or more other documents, the first classification being determined by minimizing a first distance between the first numerical fixed length vector and one or more other numerical fixed length vectors resulting from an encoding of one or more other streams that model the one or more other documents;
the computer system detecting a first natural language in a query;
based on the query and the detected first natural language and based on a utilization of a search engine, the computer system selecting a second document included in the multiple documents whose content is indicated by the query and whose natural language matches the detected first natural language;
the computer system extracting second components of a structure of the second document, wherein the step extracting the second components includes the steps of:
modeling a structure of the second document as a second stream of the second components, the second stream including second words of the second document and second indicators of the structure of the second document, without an indication of a semantic meaning of the second document;
replacing, by the document stream encoder, the second words in the second stream with the first tag; and encoding, by a document structure encoder, the second stream as a second numerical fixed length vector by utilizing the LSTM network;

the computer system determining a second distance between the second numerical fixed length vector and the first numerical fixed length vector;

the computer system determining that the second distance is less than a threshold distance;

based on the extracted second components and the second distance being less than the threshold distance, the computer system identifying the first classification as including the second document and determining that a plurality of documents in the identified first classification have content that matches the content of the second document;

the computer system ranking the plurality of documents in the identified first classification based on (i) the first natural language in the query, (ii) a second natural language of a user who provides the query, and (iii) a popularity of the plurality of documents in the identified first classification; and the computer system presenting the ranked plurality of documents in the identified first classification as having content that matches the content of the second document, at least one of the ranked plurality of documents in the identified first classification being expressed in a respective natural language different from the natural language of the second document.

7. The computer program product of claim 6, wherein the steps of extracting the multiple components, classifying the multiple documents, detecting the first natural language, selecting the second document, extracting the second components, and presenting the ranked plurality of documents in the identified first classification are performed without translating the second document, the plurality of documents in the identified first classification, or the query.

8. The computer program product of claim 6, wherein the method further comprises the steps of:
   the computer system collecting user feedback about results of other queries of the multiple documents; and
   based on the collected user feedback, the computer system adjusting a ranking of the ranked plurality of documents.

9. The computer program product of claim 6, wherein the step of extracting the multiple components includes extracting indicators of words, labels, images, titles subtitles, paragraphs, tables, and starts of new lines in the multiple documents.

10. A computer system comprising:
   a central processing unit (CPU);
   a memory coupled to the CPU; and
   a computer readable storage device coupled to the CPU, the computer readable storage device containing instructions that are executed by the CPU via the memory to implement a method of searching multiple documents expressed in multiple natural languages, the method comprising the steps of:
      the computer system extracting multiple components of structures of the multiple documents expressed in the multiple natural languages, wherein the step of extracting the multiple components includes the steps of:
         modeling a structure of a first document included in the multiple documents as a first stream of first components, the first stream including first words of the first document and first indicators of the structure of the first document, without an indication of a semantic meaning of the first document;
         replacing the first words in the first stream with a first tag that indicates that each of the first words replaced by the first tag is a word; and
         encoding the first stream as a first numerical fixed length vector by utilizing a long short-term memory (LSTM) network;
      based on the extracted components of the structures of the multiple documents, the computer system classifying the multiple documents into classifications including respective, mutually exclusive sets of documents expressed in different respective natural languages, the documents in each set having matching content, wherein the step of classifying the multiple documents includes determining a first classification that includes the first document and one or more other documents, the first classification being determined by minimizing a first distance between the first numerical fixed length vector and one or more other numerical fixed length vectors resulting from an encoding of one or more other streams that model the one or more other documents;
      the computer system detecting a first natural language in a query;
      based on the query and the detected first natural language and based on a utilization of a search engine, the computer system selecting a second document included in the multiple documents whose content is indicated by the query and whose natural language matches the detected first natural language;
      the computer system extracting second components of a structure of the second document, wherein the step of extracting the second components includes the steps of:
         modeling a structure of the second document as a second stream of the second components, the second stream including second words of the second document and second indicators of the structure of the second document, without an indication of a semantic meaning of the second document;
         replacing, by the document stream encoder, the second words in the second stream with the first tag; and
         encoding, by a document structure encoder, the second stream as a second numerical fixed length vector by utilizing the LSTM network;
      determining a second distance between the second numerical fixed length vector and the first numerical fixed length vector;
      determining that the second distance is less than a threshold distance;
      based on the extracted second components and the second distance being less than the threshold distance, the computer system identifying the first classification as including the second document and determining that a plurality of documents in the identified first classification have content that matches the content of the second document;
      the computer system ranking the plurality of documents in the identified first classification based on (i) the first natural language in the query, (ii) a second natural language of a user who provides the query, and (iii) a popularity of the plurality of documents in the identified first classification; and the computer system presenting the ranked plurality of documents in the identified first classification as having content that matches the content of the second document, at least one of the ranked plurality of documents in the identified first classification being expressed in a respective natural language different from the natural language of the second document.

11. The computer system of claim 10, wherein the steps of extracting the multiple components, classifying the multiple documents, detecting the first natural language, selecting the second document, extracting the second components, and presenting the ranked plurality of documents are performed without translating the second document, the plurality of documents in the identified first classification, or the query.

12. The computer system of claim 10, wherein the method further comprises the steps of:
   the computer system collecting user feedback about results of other queries of the multiple documents; and
   based on the collected user feedback, the computer system adjusting a ranking of the ranked plurality of documents.

13. The computer system of claim 10, wherein the step of extracting the multiple components includes extracting indicators of words, labels, images, titles, subtitles, paragraphs, tables, and starts of new lines in the multiple documents.

* * * * *